(12) United States Patent
Fujii

(10) Patent No.: US 11,567,365 B2
(45) Date of Patent: Jan. 31, 2023

(54) LIGHT FLUX CONTROLLING MEMBER, LIGHT-EMITTING DEVICE, SURFACE LIGHT SOURCE DEVICE AND DISPLAY DEVICE

(71) Applicant: Enplas Corporation, Saitama (JP)

(72) Inventor: Yuki Fujii, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 0 days.

(21) Appl. No.: 17/532,176

(22) Filed: Nov. 22, 2021

(65) Prior Publication Data
US 2022/0397797 A1 Dec. 15, 2022

Related U.S. Application Data

(63) Continuation-in-part of application No. 17/346,441, filed on Jun. 14, 2021.

(51) Int. Cl.
*G02F 1/1335* (2006.01)
*G02F 1/13357* (2006.01)

(52) U.S. Cl.
CPC .. G02F 1/133607 (2021.01); G02F 1/133603 (2013.01); G02F 1/133611 (2013.01)

(58) Field of Classification Search
CPC ......... G02F 1/133607; G02F 1/133611; G02F 1/133603; G02B 3/0037; G02B 3/0056; F21V 5/007; F21V 5/0091; F21Y 2105/18
See application file for complete search history.

(56) References Cited

U.S. PATENT DOCUMENTS

| | | | |
|---|---|---|---|
| 7,334,933 B1* | 2/2008 | Simon | F21V 7/0091 362/328 |
| 2009/0059125 A1* | 3/2009 | Nagayoshi | G02F 1/133611 349/64 |
| 2012/0069575 A1* | 3/2012 | Koh | G02B 6/0046 362/257 |
| 2018/0010770 A1* | 1/2018 | Bao | F21V 13/04 |
| 2018/0335559 A1* | 11/2018 | Cho | G02B 6/0091 |
| 2020/0209458 A1* | 7/2020 | Yuu | H01L 33/62 |

FOREIGN PATENT DOCUMENTS

CN 110208984 A 9/2019

\* cited by examiner

*Primary Examiner* — Erin Kryukova
(74) *Attorney, Agent, or Firm* — Brundidge & Stanger, P.C.

(57) ABSTRACT

A light flux controlling member includes a plurality of incident units and an emission unit. The incident unit includes an incidence surface and a reflection surface. At least a part of a side surface of the light flux controlling member is configured such that $\theta_2$ is smaller than $\theta_1$, where L is a line connecting a gravity center G1 of the light flux controlling member and a center G2 of the reflection surface, L1 is a line connecting a center P1 of a light-emitting surface of the light-emitting element and a point P2 on the side surface where light emitted from the center P1, L2 is a line along light emitted from the point P2 to outside, $\theta_1$ is an angle between L and L1, and $\theta_2$ is an angle between L2 and a line L' that is parallel to L.

7 Claims, 14 Drawing Sheets

LIGHT FLUX CONTROLLING MEMBER, LIGHT-EMITTING DEVICE, SURFACE LIGHT SOURCE DEVICE AND DISPLAY DEVICE

CROSS REFERENCE TO RELATED APPLICATIONS

This application is a continuation-in-part of U.S. patent application Ser. No. 17/346,441, filed on Jun. 14, 2021, the disclosure of which, including the specification, drawings and abstract, is incorporated herein by reference in their entirety.

TECHNICAL FIELD

The present invention relates to a light flux controlling member, a light-emitting device, a surface light source device, and a display device.

BACKGROUND ART

In recent years, a direct surface light source device including a plurality of light-emitting elements as a light source is used in transmission image display devices such as liquid crystal displays. A large number of light-emitting elements may be disposed to illuminate a wide range with light.

PTL 1 discloses a light flux controlling member (microarray lens) suitable for being disposed over a plurality of light-emitting elements. A plurality of lenses is connected by a support plate in these microarray lenses, and one microarray lens is disposed above the plurality of light-emitting elements (mini LEDs) disposed on a substrate. This configuration eliminates the necessity to dispose lenses individually above corresponding light-emitting elements, and improves the ease of handling at the time of mounting, facilitating the mounting.

Citation List
Patent Literature
PTL 1
Publication of Unexamined Application of Chinese Patent Specification No. 110208984

SUMMARY OF INVENTION

Technical Problem

The present inventors attempted to reduce the number of light-emitting elements by increasing the distance between light-emitting devices in a surface light source device in which a large number of light-emitting devices including the above-mentioned plurality of light-emitting elements and a light flux controlling member disposed over them are disposed. To reduce the number of light-emitting elements, it is necessary to spread light from the light-emitting element to a wider range using the flux controlling member while suppressing generation of the luminance unevenness (darkened points).

To be more specific, the present inventors increased the distance between light-emitting devices 200' disposed in a grid pattern as illustrated in FIG. 1, which resulted in darkening in the region between light-emitting devices 200'. For example, in the example illustrated in FIG. 1, the darkening occurred especially in regions between light-emitting devices 200' in the diagonal direction.

An object of the present invention is to provide a light flux controlling member that can suppress darkening in the region between light-emitting devices even when the distance between light-emitting devices is increased. In addition, another object of the present invention is to provide a light-emitting device and a surface light source device including the light flux controlling member.

Solution to Problem

A light flux controlling member according to an embodiment of the present invention is configured to control a distribution of light emitted from a plurality of light-emitting elements disposed on a substrate when the light flux controlling member is disposed over the plurality of light-emitting elements, the light flux controlling member including: a plurality of incident units configured to allow incidence of the light emitted from the plurality of light-emitting elements; and an emission unit disposed between each of the plurality of incident units in a direction along the substrate, and configured to emit light entered from the plurality of incident units while guiding the light. Each of the plurality of incident units includes: an incidence surface disposed on a rear side of the light flux controlling member, and configured to allow incidence of light emitted from each of the plurality of light-emitting elements; and a reflection surface disposed at a position opposite to each of the plurality of light-emitting elements with the incidence surface between the reflection surface and each of the plurality of light-emitting elements on a front side of the light flux controlling member, the reflection surface being configured to laterally reflect, in a direction away from an optical axis of each of the plurality of light-emitting elements, light entered from the incidence surface. At least a part of a side surface of the light flux controlling member is configured such that $\theta_2$ is smaller than $\theta_1$, where, in plan view of the light flux controlling member, L is a line connecting a gravity center G1 of the light flux controlling member and a center G2 of the reflection surface, L1 is a line connecting a center P1 of a light-emitting surface of each of the plurality of light-emitting elements and a point P2 on the side surface of the light flux controlling member where light emitted from the center P1 of the light-emitting surface and reflected by the reflection surface directly reaches, L2 is a line along light emitted from the point P2 to outside of the light flux controlling member, $\theta_1$ is an angle between L and L1, and $\theta_2$ is an angle between L2 and a line L' that is parallel to L.

A light-emitting device according to an embodiment of the present invention includes: a plurality of light-emitting elements disposed on a substrate; and the light flux controlling member according to claim 1 that is disposed over the plurality of light-emitting elements.

A surface light source device according to an embodiment of the present invention includes: the light-emitting device; and an optical sheet or a light diffusion plate configured to transmit light emitted from the light-emitting device.

A display device according to an embodiment of the present invention includes: the surface light source device; and a display member configured to be illuminated with light emitted from the surface light source device.

Advantageous Effects of Invention

According to the present invention, it is possible to provide a light flux controlling member that can suppress darkening in the region between light-emitting devices even when the distance between light-emitting devices is increased.

In addition, according to the present invention, it is possible to provide a light-emitting device, a surface light source device and a display device including the above-mentioned light flux controlling member.

DESCRIPTION OF EMBODIMENTS

Hereinafter, one or more embodiments of the present invention will be described in detail with reference to the drawings. In the following description, a surface light source device suitable for a backlight of a liquid crystal display device or the like will be described as a typical example of the surface light source device according to the present invention. Such a surface light source device can be used as display device 100' in combination with display member 102 (such as a liquid crystal panel) configured to be illuminated with light from the surface light source device (see FIG. 2B). Note that the drawings are for describing the invention, and may not be drawn to scale.

Configuration of Surface Light Source Device and Light-Emitting Device

Figure 1:
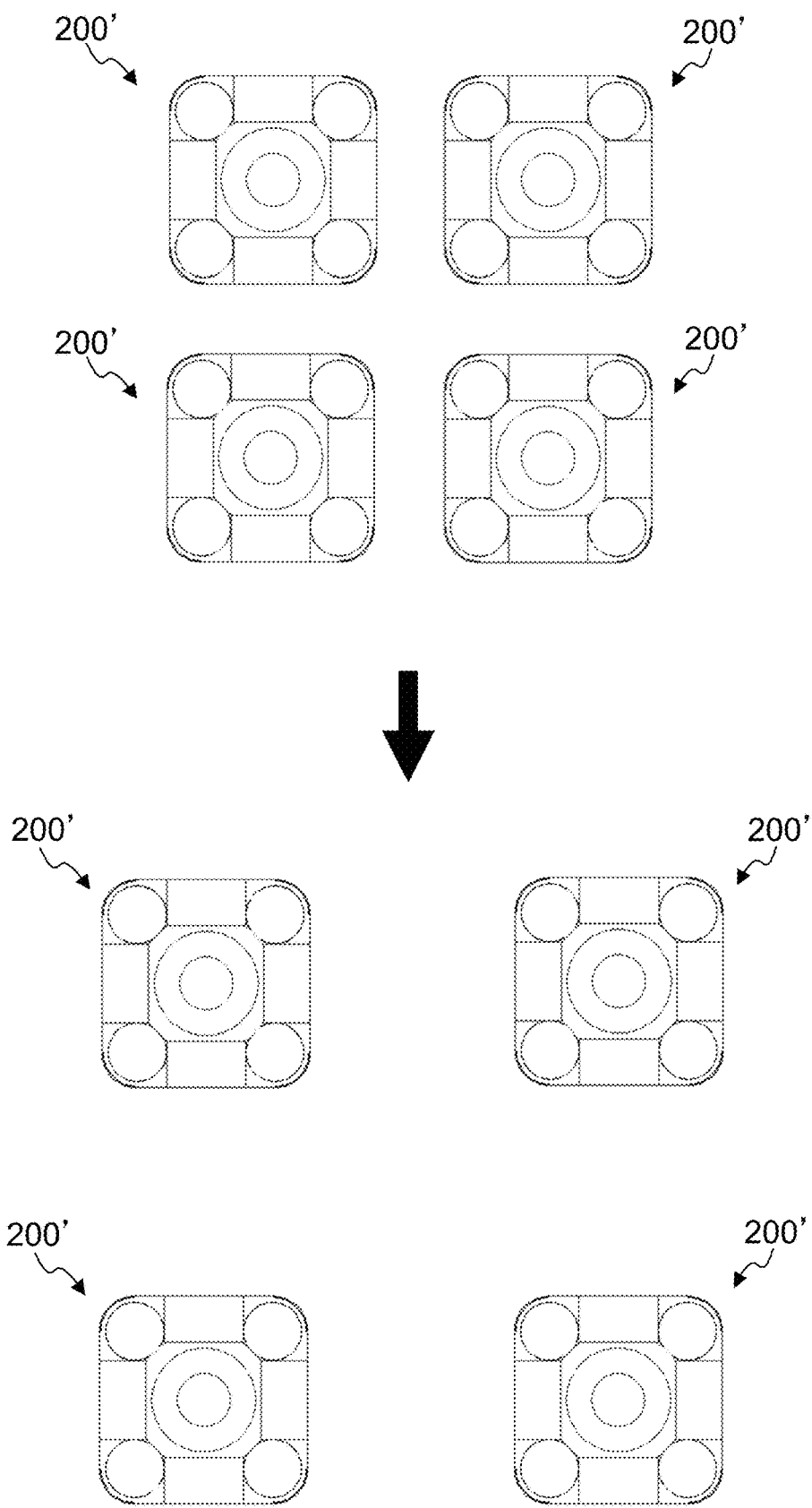
FIG. 1 is a diagram for describing a state where a distance between light-emitting devices of the related art is increased.
Figure 2A:
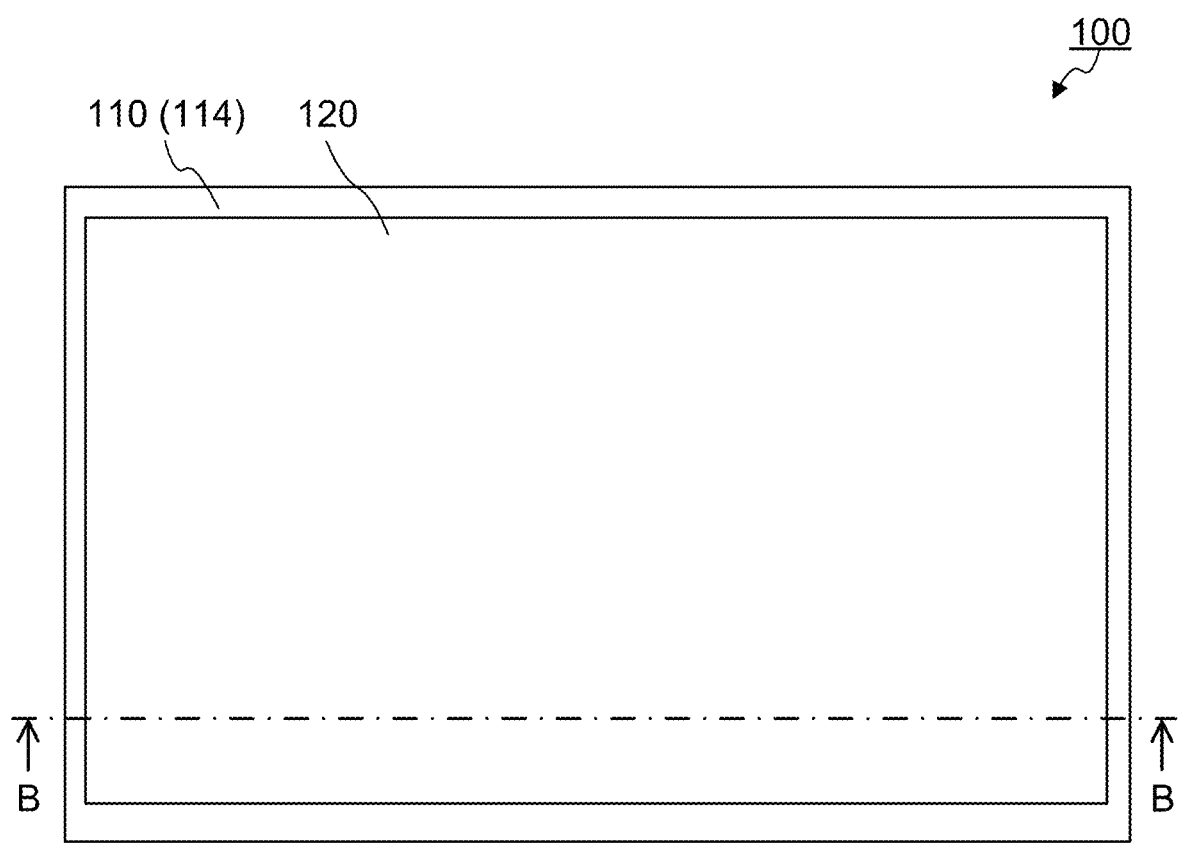
FIGS. 2A and 2B illustrate a surface light source device according to an embodiment.
Figure 2B:
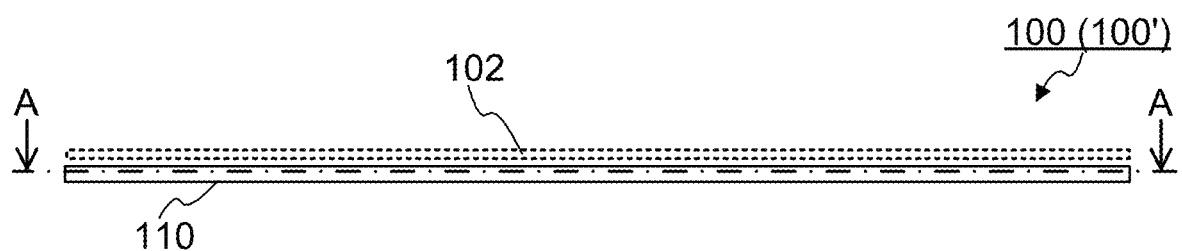
Figure 3A:
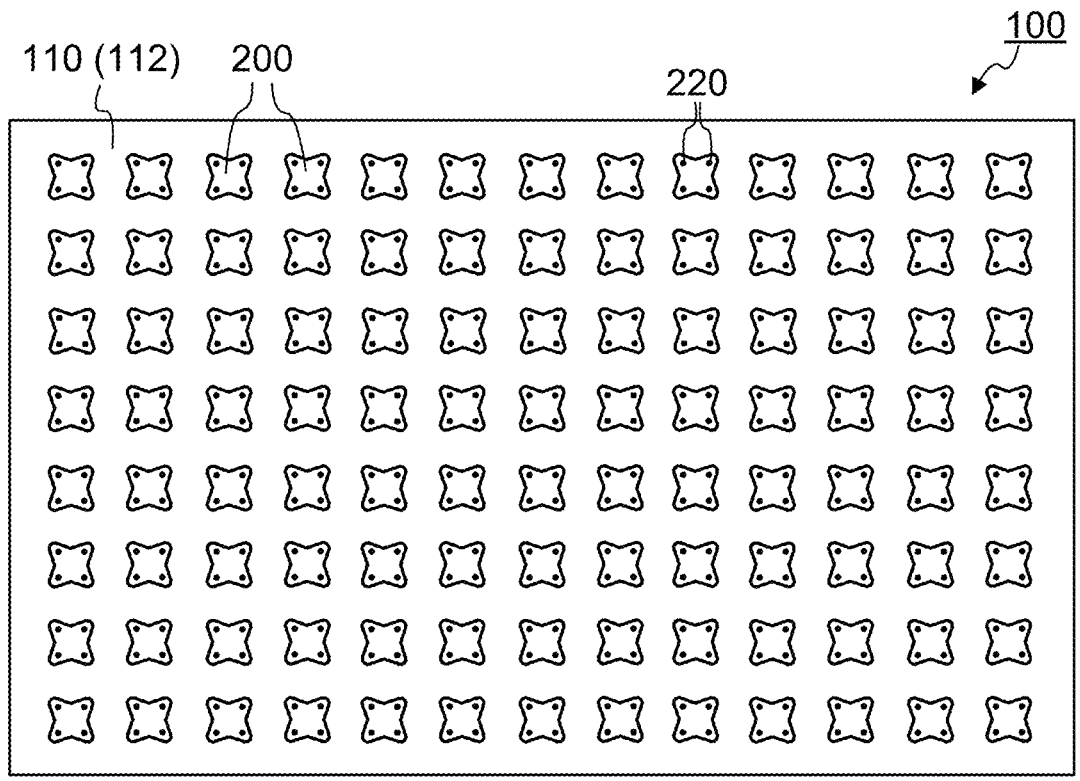
FIGS. 3A and 3B are cross-sectional views of the surface light source device according to the embodiment.
Figure 3B:
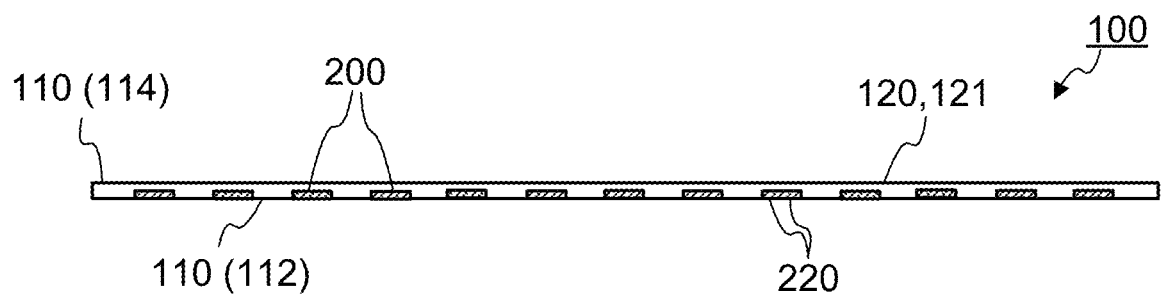
Figure 4:
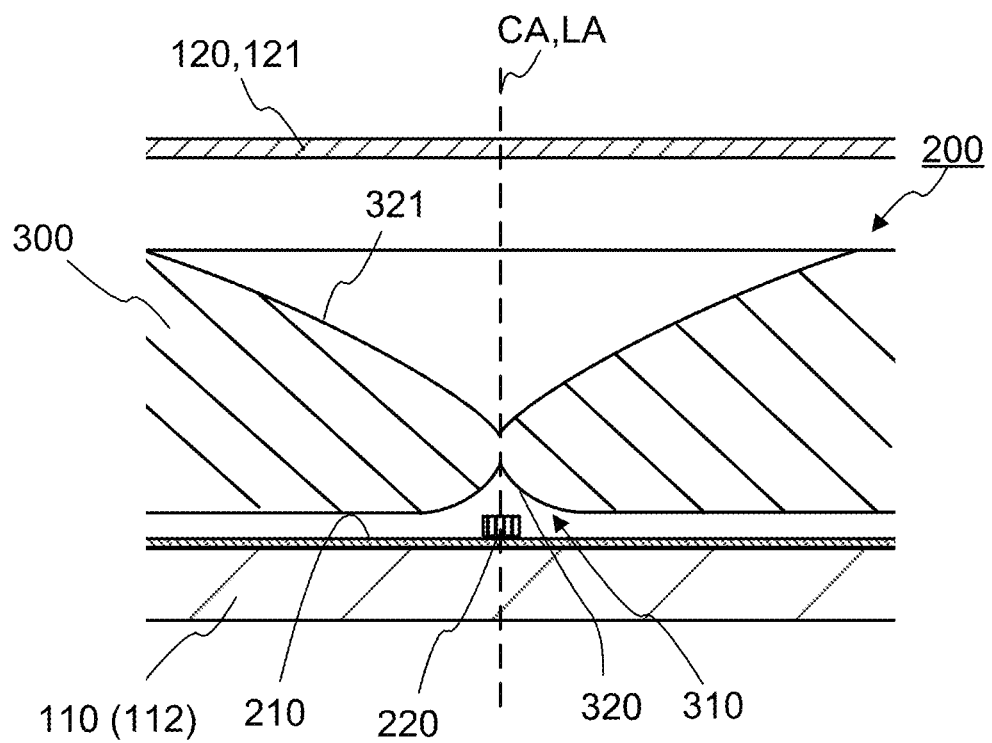
FIG. 4 is a partially enlarged cross-sectional view of FIG. 3B.

FIGS. 2A and 2B illustrate a configuration of surface light source device 100 according to the embodiment of the present invention. FIG. 3A is a plan view, and FIG. 2B is a front view. FIG. 2A is a cross-sectional view taken along line A-A of FIG. 2B, and FIG. 3B is a cross-sectional view taken along line B-B of FIG. 2A. FIG. 4 is a partially enlarged cross-sectional view illustrating an enlarged part of FIG. 3B.

As illustrated in FIGS. 2A to 3, surface light source device 100 according to the present embodiment includes housing 110, a plurality of light-emitting devices 200 and light diffusion plate 120. Surface light source device 100 according to the present embodiment may include optical sheet 121 in place of light diffusion plate 120. The plurality of light-emitting device 200 are disposed in a grid pattern (in a matrix) on bottom plate 112 of casing 110. The inner surface of bottom plate 112 functions as a diffusive reflection surface. Top plate 114 of casing 110 is provided with an opening. Light diffusion plate 120 is disposed to close the opening, and functions as a light-emitting surface. The light-emitting surface has a size of, but not limited thereto, about 400 mm x about 700 mm, for example.

As illustrated in FIG. 4, light-emitting device 200 is fixed on substrate 210. Substrate 210 is fixed at a predetermined position on bottom plate 112 of housing 110. Light-emitting device 200 includes a plurality of light-emitting elements 220 and light flux controlling member 300.

Light-emitting element 220 is a light source of surface light source device 100 and is mounted on substrate 210. In the present embodiment, the plurality of light-emitting elements 220 is disposed in a grid pattern (matrix pattern). In addition, in the present embodiment, the pitch of light-emitting elements 220 disposed between light-emitting devices 200 is greater than the pitch of light-emitting elements 220 disposed in light-emitting device 200. Light-emitting element 220 is, for example, a light-emitting diode (LED). In addition, while the type of light-emitting element 220 is not limited, light-emitting element 220 that emits light from the top surface and the side surface (e.g., a COB light-emitting diode) and the like is favorably used for light-emitting device 200 according to the present embodiment. For example, the color of the light emitted from light-emitting element 220 is, but not limited thereto, white, blue, RGB or the like. Preferably, light-emitting element 220 has a size of, but not limited thereto, 0.1 mm to 0.6 mm, more preferably 0.1 mm to 0.3 mm or greater.

Light flux controlling member 300 is an optical member that controls the distribution of light emitted from the plurality of light-emitting elements 220, and is fixed on substrate 210 to cover the plurality of light-emitting elements 220. Note that in the present embodiment, light flux controlling member 300 controls the distribution of light emitted from four light-emitting elements 220. Light flux controlling member 300 includes a plurality of incident units 310 (see FIGS. 5A to 5F). As described later, each incident unit 310 includes incidence surface 320 that allows incidence of light emitted from light-emitting element 220, and first reflection surface 321 that reflects, toward emission unit 330, light entered from incidence surface 320. In light flux controlling member 300 according to the present embodiment, incidence unit 310 (incidence surface 320 and first reflection surface 321) of light flux controlling member 300 is rotationally symmetric. The rotation axis of incident unit 310 is referred to as "central axis of incident unit 310". In addition, "light axis LA of light-emitting element 220" means a central light beam of a stereoscopic emission light flux from light-emitting element 220. A gap for releasing the heat generated from light-emitting element 220 to the outside may or may not be formed between substrate 210 with light-emitting element 220 mounted thereon and the back surface of light flux controlling member 300.

Light flux controlling member 300 is formed by integral molding. The material of light flux controlling member 300 may be any material that allows light with a desired wavelength to pass therethrough. The material of light flux controlling member 300 is, for example, an optically transparent resin such as polymethylmethacrylate (PMMA), a polycarbonate (PC), or an epoxy resin (EP), or glass. Note that the configuration of light flux controlling member 300 is described later.

Light diffusion plate 120 is a plate-shaped member having a light diffusing property, and transmits light emitted from light-emitting device 200 while diffusing the light. Normally, the size of light diffusion plate 120 is substantially the same as that of the display member such as a liquid crystal panel. Light diffusion plate 120 is formed of, for example, an optically transparent resin such as polymethylmethacrylate (PMMA), a polycarbonate (PC), polystyrene (PS), or a styrene-methylmethacrylate copolymer resin (MS). In order to provide a light diffusing property, minute irregularities are formed in the surface of light diffusion plate 120, or light diffusing members such as beads are dispersed inside light diffusion plate 120.

Optical sheet 121 may be independently used or may be used together with light diffusion plate 120. Optical sheet 121 is a sheet-shaped member, and light is transmitted through optical sheet 121 as with the light diffusion plate. Optical sheet 121 is, for example, a prism sheet, a wavelength conversion sheet that can convert the wavelength of light transmitting through it, or the like. Optical sheet 121 is used in the state where optical sheet 121 is stacked on light diffusion plate 120, for example.

In surface light source device 100 according to the present embodiment, light emitted from each light-emitting element 220 is spread by light flux controlling member 300 to illuminate a wide range of light diffusion plate 120 or optical sheet 121. The light emitted from each light flux controlling member 300 is further diffused by light diffusion plate 120. Surface light source device 100 according to the present embodiment can thus uniformly illuminate a planar display member (e.g., a liquid crystal panel).

Configuration of Light Flux Controlling Member

Figure 5A:
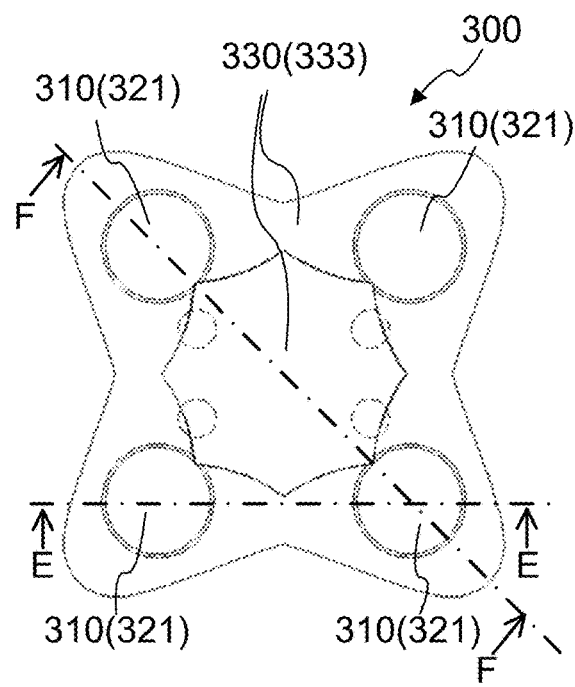
FIGS. 5A to 5F illustrate a light flux controlling member according to the embodiment.
Figure 5B:
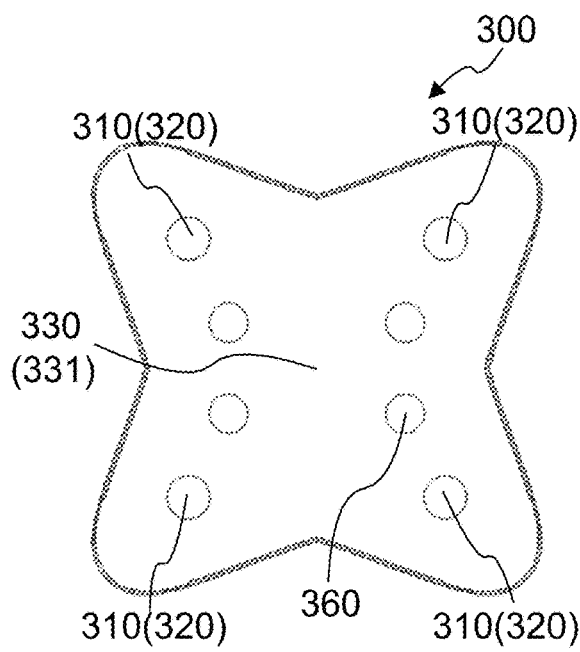
Figure 5C:
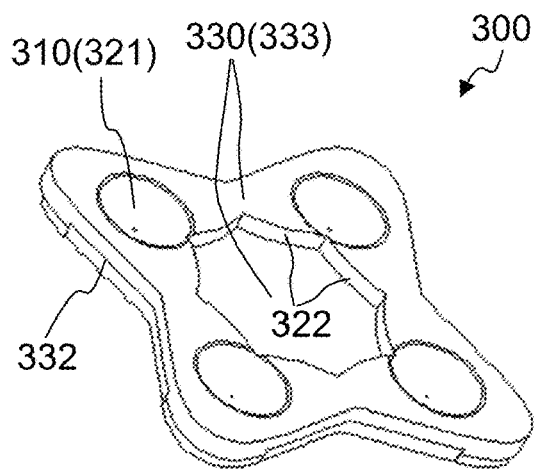
Figure 5D:
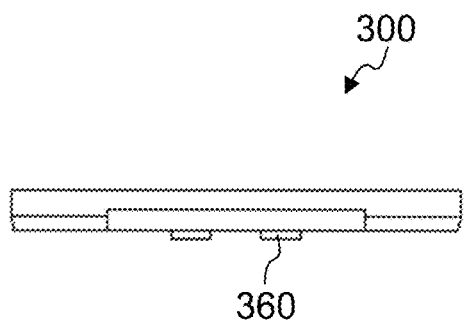
Figure 5E:
Figure 5F:
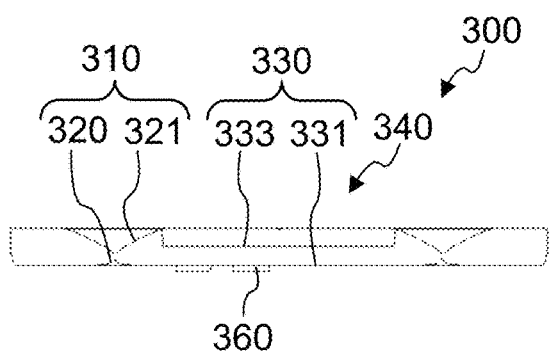

FIG. 5A is a plan view of light flux controlling member 300 of light-emitting device 200 according to the present embodiment, FIG. 5B is a bottom view of light flux controlling member 300, FIG. 5C is a perspective view of light flux controlling member 300, FIG. 5D is a side view of light flux controlling member 300, FIG. 5E is a sectional view taken along line E-E of FIG. 5A, and FIG. 5F is a sectional view taken along line F-F of FIG. 5A. The configuration of light flux controlling member 300 is described below.

As illustrated in FIGS. 5C and 5D, in the present embodiment, light flux controlling member 300 is a member having a plate-like shape. In plan view, light flux controlling member 300 has a shape in which the middle point of each side of a quadrangular (square) shape is shifted to the center side. In the present embodiment, each corner of the quadrangular is round, but the angle formed by extended adjacent two sides (straight lines) is an acute angle.

As illustrated in FIGS. 5A to 5E, light flux controlling member 300 according to the present embodiment is for controlling the orientation of light emitted from a plurality of light-emitting elements 220 disposed on substrate 210, and light flux controlling member 300 includes a plurality of incidence units 310 and at least one emission unit 330. Plurality of incidence units 310 are disposed in a grid pattern corresponding to the arrangement of light-emitting elements 220. In the present embodiment, four incident units 310 are disposed in the proximity of the corners of the above-described quadrangular (square) shape.

Emission unit 330 is disposed between the plurality of incident units 310 in the direction along substrate 210. In addition, in the present embodiment, light flux controlling member 300 includes a plurality of (four) leg parts 360 (see FIG. 5B).

Each of the incidence units 310 allows incidence of light emitted from corresponding light-emitting element 220.

Incidence unit 310 includes incidence surface 320 that allows incidence of light emitted from light-emitting element 220, and first reflection surface 321 that reflects the light incident on incidence surface 320 toward emission unit 330.

Incidence surface 320 is an inner surface of a recess disposed on the rear side in light flux controlling member 300 and formed at a position opposite to light-emitting element 220 (see FIG. 4). Incidence surface 320 allows a large part of light emitted from light-emitting element 220 to enter light flux controlling member 300 while controlling the travelling direction of the light. Incidence surface 320 intersects light axis LA of light-emitting element 220 and is rotationally symmetrical (circularly symmetrical) about central axis CA. The shape of incidence surface 320 is not limited, and is set such that light entered from incidence surface 320 travels toward first reflection surface 321 and emission surface 333. In the present embodiment, incidence surface 320 has a shape whose distance from substrate 210 gradually decreases with the increasing distance from light axis LA of light-emitting element 220.

First reflection surface 321 is disposed on the front side of light flux controlling member 300 at a position opposite to light-emitting element 220 with incidence surface 320 therebetween, and laterally reflects, in a direction away from light axis LA of light-emitting element 220, the light entered from incidence surface 320. To be more specific, preferably, first reflection surface 321 is configured such that substantially all of the light emitted from the center of the light-emitting surface of light-emitting element 220 is reflected at first reflection surface 321. Here, the lateral direction does not mean a direction of the outer edge of light flux controlling member, but means the outward direction in the radial direction 360° around the optical axis.

Thus, first reflection surface 321 can prevent the generation of a bright spot at a position directly above light-emitting element 220 by preventing light entered from incidence surface 320 from escaping upward, and can prevent the generation of a dark spot at a position between light-emitting elements 220 by guiding the light to the position between light-emitting elements 220. First reflection surface 321 may have any shape as long as the shape can laterally reflect the light entered from incidence surface 320. First reflection surface 321 is, for example, rotationally symmetrical (circularly symmetrical) about central axis CA of light-emitting element 220, and is configured such that the distance to the front side decreases (or it goes away from substrate 210) as the distance from light axis LA of light-emitting element 220 increases.

The generatrix from the center toward the outer periphery of that rotationally symmetrical shape is a curved or straight line inclined with respect to central axis CA. First reflection surface 321 is a recessed surface obtained by rotating that generatrix 360° with central axis CA of incidence surface 320 as a rotation axis.

In the present embodiment, incidence surface 320 and first reflection surface 321 are each an inner surface of a recess, and the area of the opening edge of the recess forming first reflection surface 321 is preferably 0.5 to 2.0 times, more preferably 0.5 to 1.5 times, and particularly preferably 0.5 to 1.3 times, the area of the opening edge of the recess constituting incidence surface 320, in plan view.

A plurality of the emission units 330 is disposed between the plurality of incident units 310. The plurality of the emission units 330 emit light entered from the plurality of incident units 310 while guiding the light. A part of light guided inside emission unit 330 reaches the side surface of light flux controlling member 300 and is then emitted to the outside. In the present embodiment, assuming that four incidence units 310 are disposed at respective corners of a virtual quadrangle, light flux controlling member 300 includes four emission units 330 disposed at positions corresponding to the four sides of the virtual quadrangle along the respective sides, and one emission unit 330 surrounded by the virtual quadrangle. As illustrated in FIG. 5F, each emission unit 330 includes second reflection surface 331, which is disposed on the rear side of light flux controlling member 300 and configured to reflect light from first reflection surface 321 of incidence unit 310. In addition, emission unit 330 includes emission surface 333, which is disposed opposite to second reflection surface 331 on the front side of light flux controlling member 300 and configured to reflect a part of light from incident unit 310 while emitting another part of the light.

The shape of emission surface 333 is not limited. In the present embodiment, emission surface 333 is disposed at a position corresponding to the four sides of a virtual quadrangle. In addition, emission surface 333 is surrounded by the virtual quadrangle.

In addition, in the present embodiment, light is emitted toward the space between light-emitting devices 200 from side surface 332 (the side surface of incidence unit 310 and the side surface emission unit 330) of light flux controlling member 300 in addition to the above-mentioned emission surface 333.

In addition, in the present embodiment, light flux controlling member 300 includes leg part 360. In the present embodiment, light flux controlling member 300 includes four leg parts 360 (see FIG. 5B).

Figure 6A:
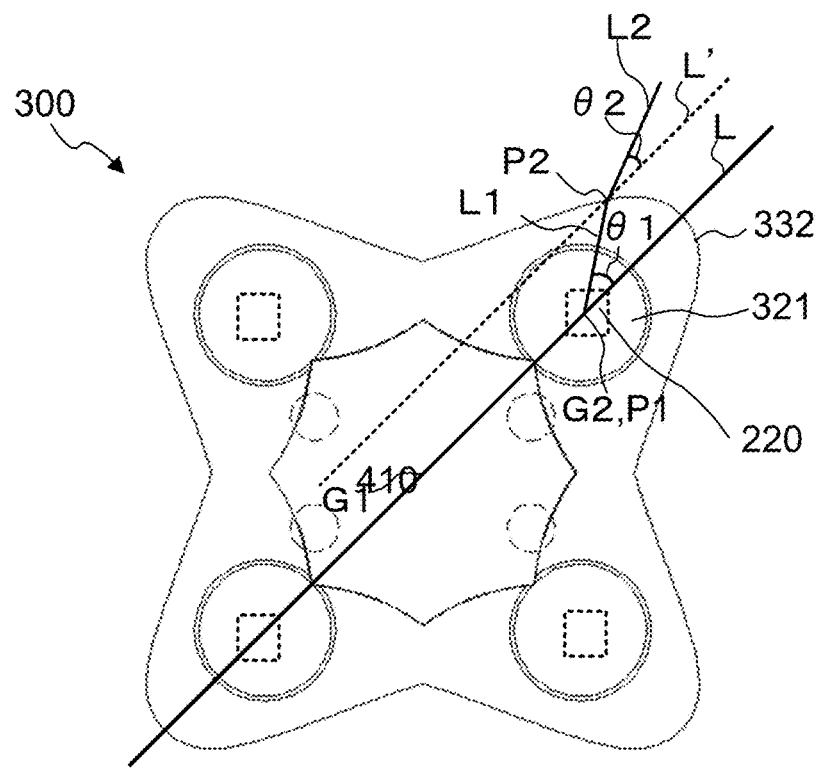
FIGS. 6A and 6B illustrate an angle of light emitted from the light flux controlling member.

Light flux controlling member 300 according to the present embodiment has a structure for suppressing generation of dark points between light flux controlling members 300 as illustrated in FIG. 6A. Specifically, as illustrated in FIG. 6A, at least a part of side surface 332 of light flux controlling member 300 is configured such that θ2 is smaller than θ1 in plan view of light flux controlling member 300, where: θ1 is an angle between L and L1; θ2 is an angle between L2 and L' parallel to L; L is a line connecting gravity center G1 of light flux controlling member 300 and center G2 of first reflection surface 321; L1 is a line connecting center P1 of the light-emitting surface of light-emitting element 220 and point P2 on side surface 332 of light flux controlling member 300 where light emitted from center P1 of light-emitting surface and reflected by first reflection surface 321 directly reaches; and L2 is a line along light emitted from point P2 to the outside of light flux controlling member 300. Note that the state where light reflected by first reflection surface 321 directly reaches means that the light reaches without passing through other optical control surfaces after being reflected by first reflection surface 321.

With side surface 332 of light flux controlling member 300 configured in the above-described manner, light reflected by first reflection surface 321 and emitted from side surface 332 of light flux controlling member 300 (the side surface of incidence unit 310) to the outside is easily emitted in a manner closer to straight line L. Thus, it is possible to suppress the darkening in a region between light-emitting devices 200, or more particularly, a region between light-emitting devices 200 adjacent to each other in the diagonal direction in the plurality of light-emitting devices 200 disposed in a grid pattern. Note that as seen in FIG. 6A, θ2 is 0° in the case where L and L2 are parallel to each other, whereas θ2 has a negative value in the case where L and L2 intersect each other in the light travelling direction. In addition, light flux controlling member 300 easily collects the light in the L direction in the above-mentioned manner, and it is therefore preferable that light flux controlling member 300 be disposed with the L direction aligned with a direction where a dark point is generated.

Figure 6B:
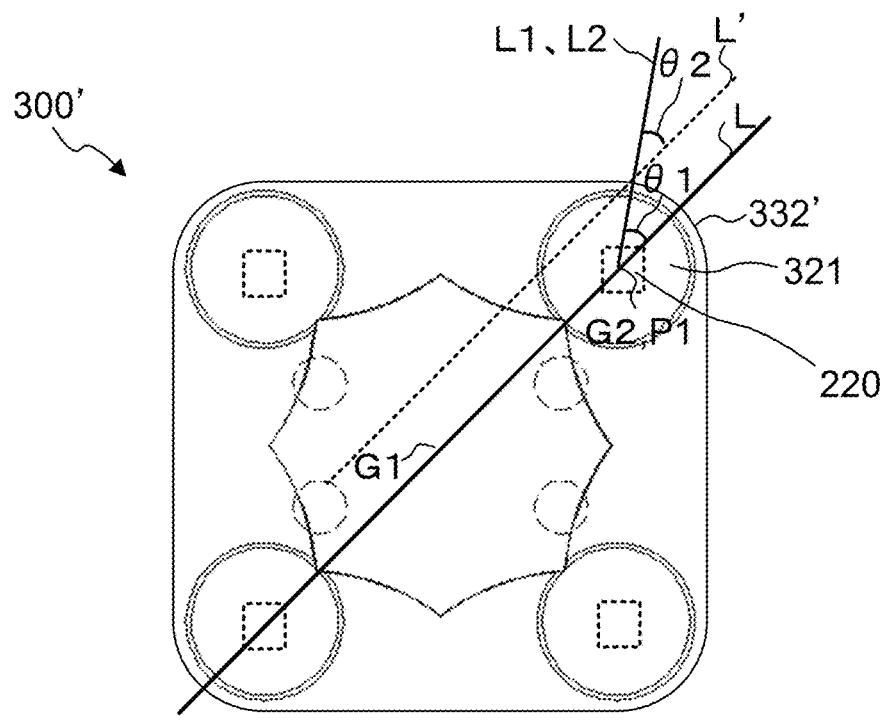

FIG. 6B illustrates light flux controlling member 300' of the related art, which does not have the above-described configuration. As illustrated in FIG. 6B, in light flux controlling member 300' in plan view, side surface 332' of light flux controlling member that is opposite to first reflection surface 321 does not have the above-mentioned configuration, and light reflected by first reflection surface 321 travels straight (θ1=θ2) without being refracted by side surface 332'. Therefore, θ2 is not smaller than θ1. One reason for this is that side surface 332' is located on the circle centered on center G2 of first reflection surface 321, and that the outer edge of first reflection surface 321 and side surface 322' are concentric.

The configuration in which θ2 is smaller than θ1 in light flux controlling member 300 according to the present embodiment is described below with reference to FIGS. 7A and 7B.

Figure 7A:
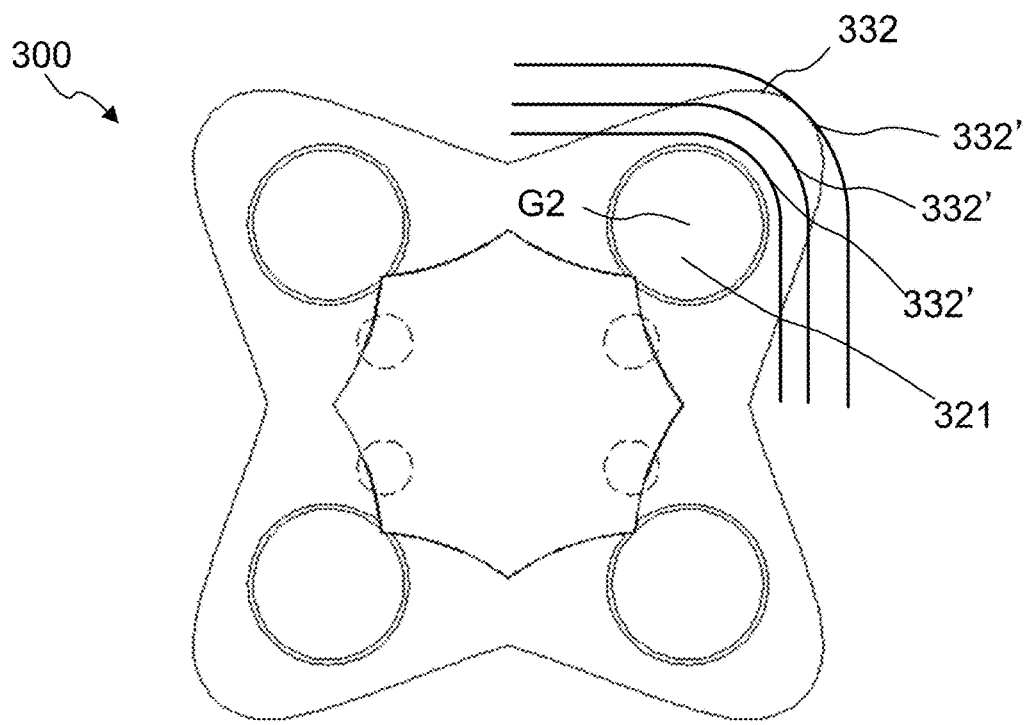
FIGS. 7A and 7B are diagrams for describing a shape of the light flux controlling member according to the embodiment.
Figure 7B:
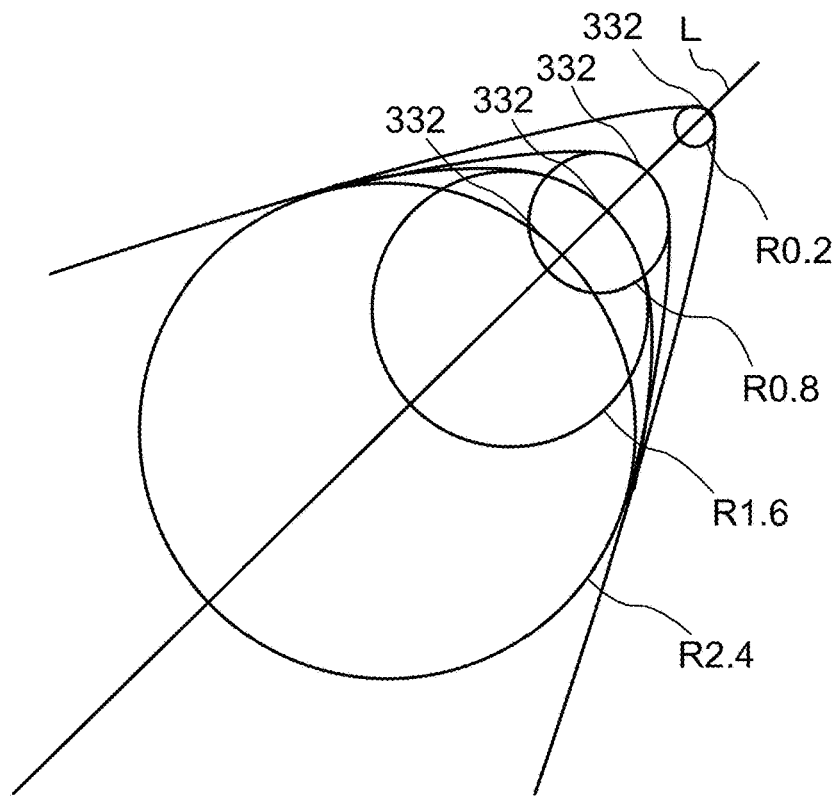

FIG. 7A is a diagram for describing side surface 332 of light flux controlling member 300 according to the present embodiment. In FIG. 7A, on light flux controlling member 300 according to the present embodiment, a plurality of side surfaces 332' (side surfaces 332' of light flux controlling member 300' of the related art) that is concentric with center G2 of first reflection surface 321.

As illustrated in FIG. 7A, side surface 332' at a corner of light flux controlling member 300' of the related art is concentric with the outer edge of first reflection surface 321. Therefore, light that reaches side surface 332' after being reflected by first reflection surface 321 travels straight, and θ1=θ2 holds.

On the other hand, side surface 332 at a corner of light flux controlling member 300 according to the present embodiment is not concentric with the outer edge of first reflection surface 321, and located on a circle having a curvature radius smaller than (a curvature larger than) the concentric circle. The center of this circle is located on L. To be more specific, for example, as illustrated in FIG. 7B, side surface 332 of the corner is located on a circle centered on L with a curvature radius of R2.4, R1.6, R0.8 or R0.2. In addition, two side surfaces 332 on both sides of the corner form an acute angle rather than a right angle. Thus, light emitted from first reflection surface 321 is refracted at side surface 332 to approach L, and θ1>θ2 holds.

Figure 8A:
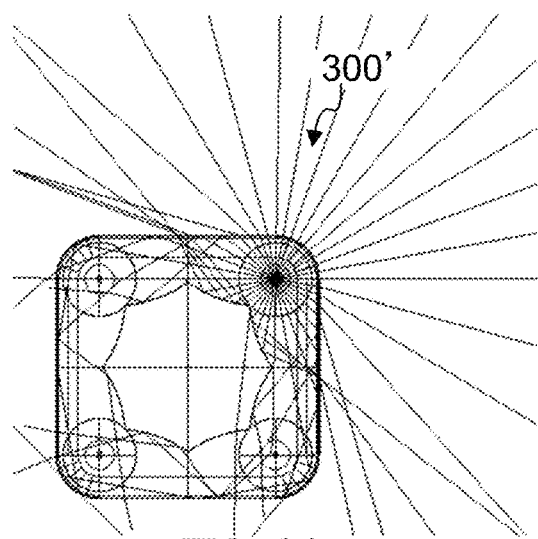
FIGS. 8A to 8E illustrate light paths of light emitted from the light flux controlling member.
Figure 8B:
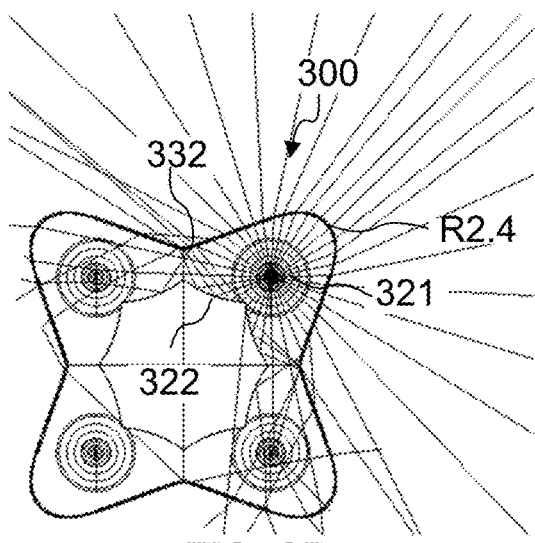
Figure 8C:
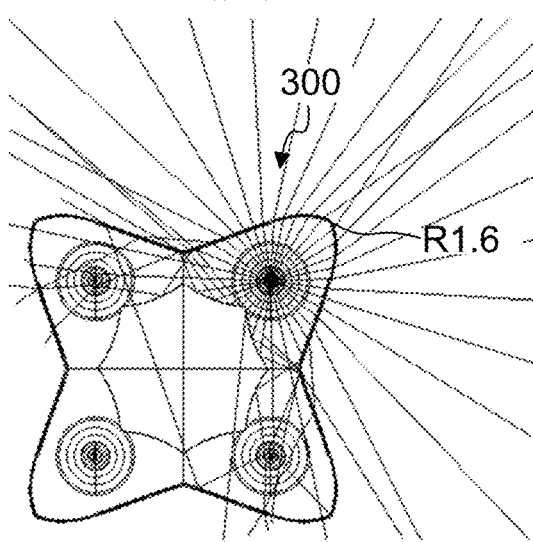
Figure 8D:
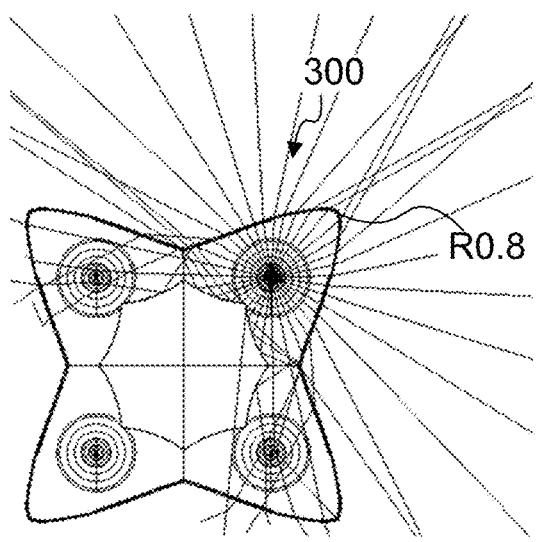

The relationship between θ1 and θ2 is described below in more detail with reference to FIGS. 8A to 9. FIG. 8A illustrates light paths in light flux controlling member 300' of the related art, and FIGS. 8B, 8C, 8D and 8E illustrate light paths of light flux controlling member 300 according to the present embodiment in the case where side surface 322 at a corner has a curvature radius of R2.4, R1.6, R0.8 or R0.2 as illustrated in FIG. 7B. FIG. 9 illustrates relationships between θ1 and θ2 in light flux controlling member 300' of the related art illustrated in FIG. 8A, and light flux controlling member 300 according to the present embodiment illustrated in FIGS. 8B to 8D (curvature radius R2.4, R1.6, R0.8).

As seen in FIGS. 8A to 8E and 9, the smaller the curvature radius (the shaper the corner of light flux controlling member 300), the greater the refraction of light emitted from side surface 322 in the vicinity of the corner, resulting in θ2 smaller than θ1. That is, light emitted from side surface 322 is more likely to be closer to L. Note that as described above, the case where θ2 has a negative value indicates that L2 intersects L.

Here, for the purpose of bring the light emitted from side surface 322 closer to L, it is also preferable to reduce the curvature radius of the corner as much as possible.

Figure 8E:
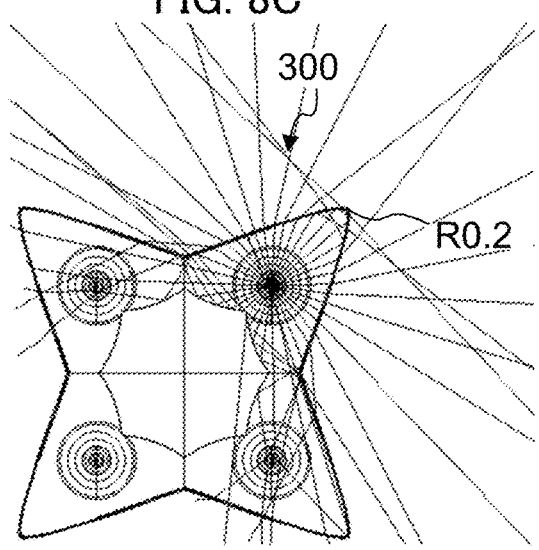
Figure 9:
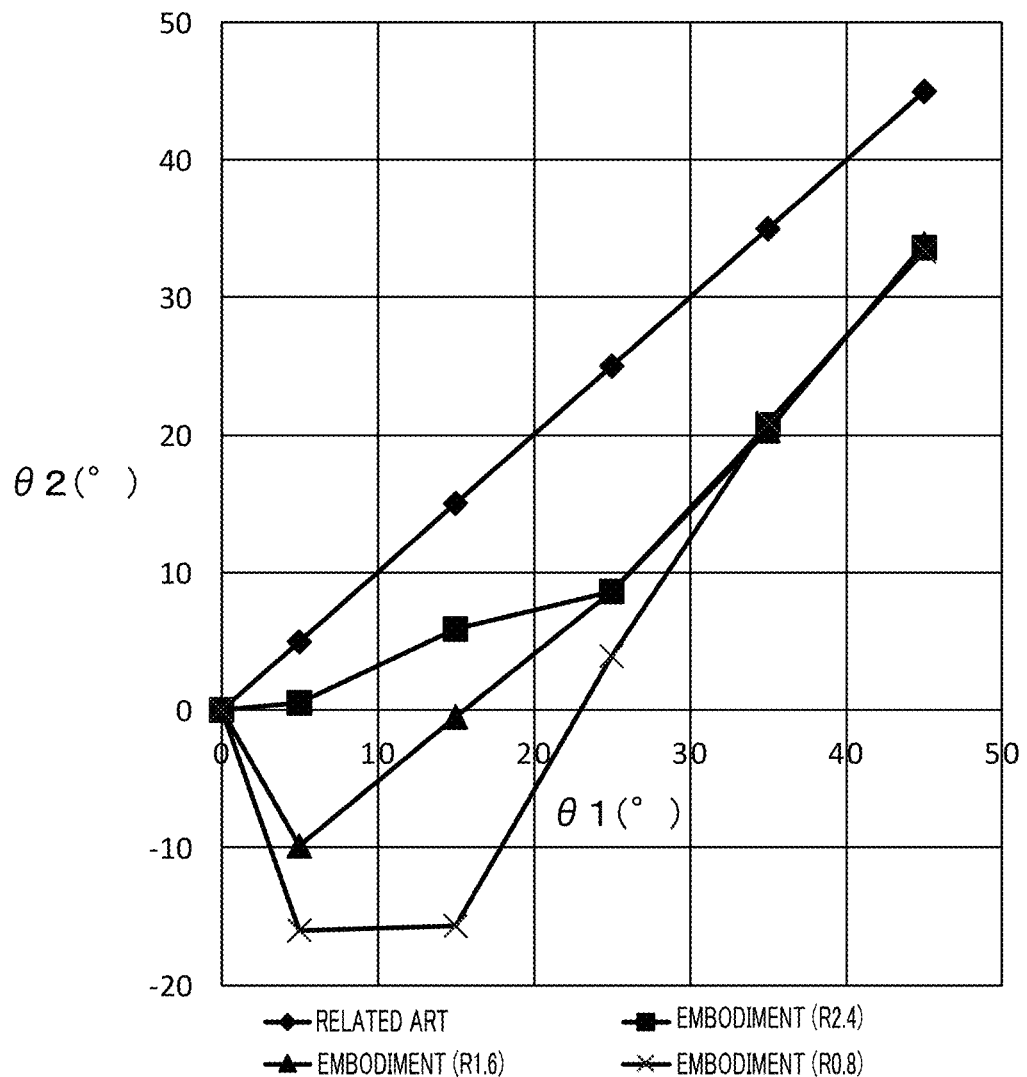
FIG. 9 is a graph illustrating a relationship between angles θ1 and θ2.

However, as illustrated in FIG. 8E, when the curvature radius is excessively small, a part of the light having reached side surface 332 is internally reflected without being transmitted through side surface 332. It is preferable that side surface 332 of light flux controlling member 300 be configured to not cause such an internal reflection. Note that here, the internal reflection means total reflection, rather than Fresnel reflection. In addition, from a view point of effectively suppressing generation of dark points in regions between light-emitting devices 200, it is preferable that L2 be not intersect L. That is, it is preferable that θ2 be 0° or greater)(θ2>0°).

Note that a case where the plurality of light-emitting elements 220 is disposed on a square grid pattern is described above. In this case, generation of dark points can be effectively suppressed when light flux controlling member 300 has point P2 where θ2 is smaller than θ1 within a range of 0° <θ1 ≤45° as illustrated in FIGS. 8A and 9 for example.

Alternatively, the plurality of light-emitting elements 220 may be disposed in a rectangular grid pattern other than a square grid pattern. Also in this case, it suffices that the side surface of light flux controlling member is configured such that θ2 is smaller than θ1. In this manner, light is likely to be collected in the L direction, and thus generation of dark points can be suppressed as described above.

A structure that may be provided in light flux controlling member 300 for the purpose of suppressing luminance unevenness when the distance between light flux controlling members 300 is increased is described below with reference to FIG. 8B as an example. As illustrated in FIG. 8B, light flux controlling member 300 may include third reflection surface 322 disposed opposite to side surface 332 of light flux controlling member 300 with first reflection surface 321 therebetween. Third reflection surface 322 laterally reflects a part of light reflected by first reflection surface 321 toward side surface 332 of light flux controlling member 300 (see also FIG. 5C). A large part of light reflected by third reflection surface 322 is emitted to the outside from side surface 332 of emission unit 330 of light flux controlling member 300 (see FIG. 8B).

Figure 10A:
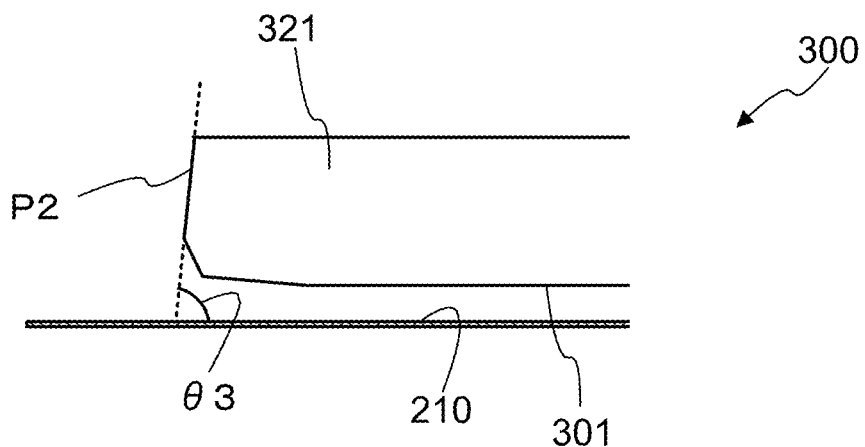
FIGS. 10A and 10B illustrate a structure of a side surface of the light flux controlling member according to the embodiment.
Figure 10B:
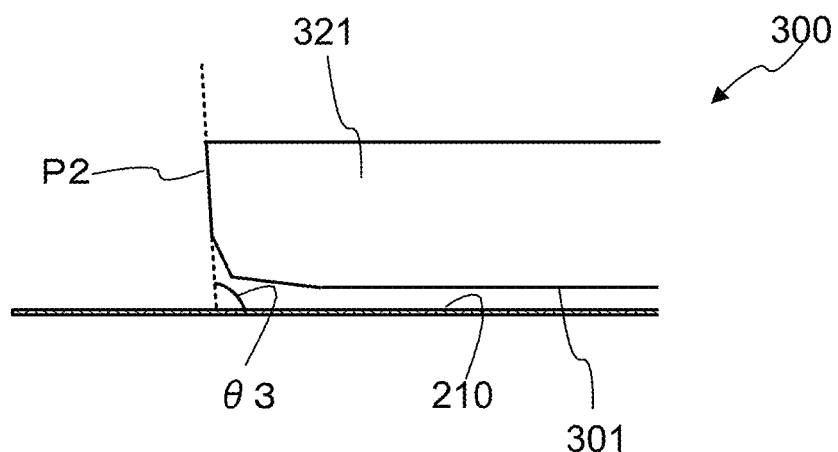

A structure that may be provided in light flux controlling member 300 for the purpose of more reliably suppressing generation of dark points is described below with reference to FIGS. 10A and 10B. FIGS. 10A and 10B illustrate a cross-section perpendicular to rear surface 301 (substrate 210) of light flux controlling member 300. Note that hatching is omitted in FIGS. 10A and 10B. As illustrated in FIGS. 10A and 10B, side surface 332 of light flux controlling member 300 (a side surface including point P2) is tilted with respect to rear surface 301 (substrate 210). FIG. 10A illustrates a case where inclination angle θ3 is smaller than the right angle, and FIG. 10B illustrates a case where inclination angle θ3 is greater than the right angle. Note that the cross-sectional shape of side surface 332 may be straight or curved.

For example, by appropriately adjusting inclination angle θ3 illustrated in FIG. 10A, it is possible to easily deliver light emitted from side surface 332 to a region where dark points tend to be generated in optical sheet 121 or light diffusion plate 120 in surface light source device 100 (see FIG. 4). In this manner, it is possible to reliably direct the light to a point where dark points are generated.

Likewise, by appropriately adjusting inclination angle θ3 illustrated in FIG. 10B, it is possible to easily deliver light emitted from side surface 332 to substrate 210 that is opposite to a region where dark points tend to be generated in optical sheet 121 or light diffusion plate 120 in surface light source device 100 (or to bottom plate 112 of housing 110) (see FIG. 4). The light having reached substrate 210 (or bottom plate 112) is diffused and reflected toward light diffusion plate 120 or optical sheet 121. In this manner, it is possible to reliably direct the light to a point where dark points are generated.

Figure 10C:
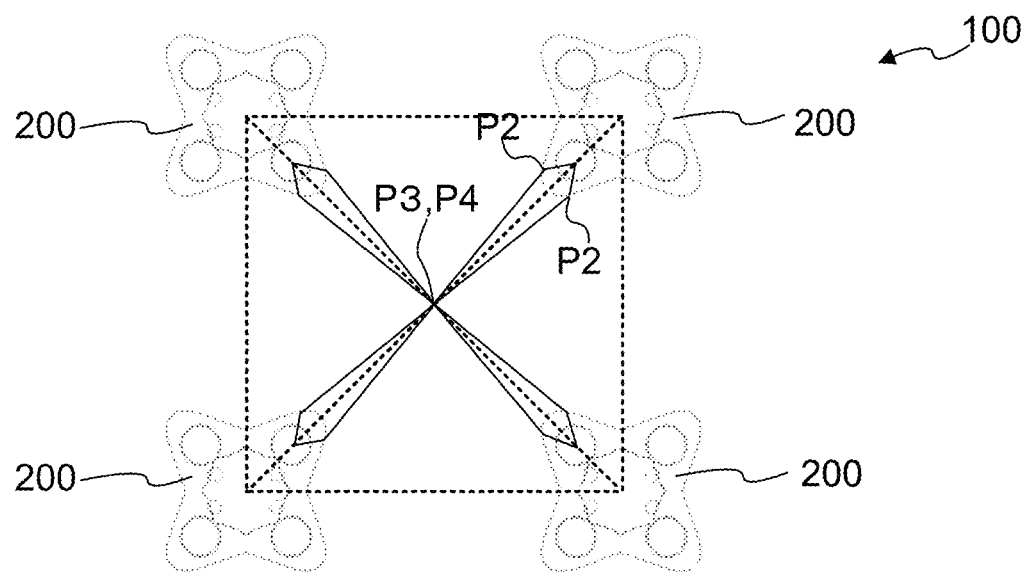
FIG. 10C illustrates points where light reached in the surface light source device.

In addition, as illustrated in FIG. 10C, it is preferable that a part of light emitted from light-emitting device 200 reach a region that is most likely to be darkened between light-emitting devices 200 in surface light source device 100. Specifically, it is preferable that a plurality of P4s partially coincide with P3 in plan view of surface light source device 100 where the plurality of light-emitting devices 200 is disposed in a grid pattern, where P3 is a middle point of a line connecting the gravity center of a certain light-emitting device 200 the plurality of light-emitting devices 200 and the gravity center of another light-emitting device 200 adjacent to the certain light-emitting device 200 in the diagonal direction of the grid, and P4 is a point where light emitted from center P1 of light-emitting surface and emitted from point P2 of side surface 332 reaches substrate 210, optical sheet 121 or light diffusion plate 120, in the certain light-emitting device 200. In this manner, it is possible to reliably direct the light to a point where dark points are generated.

In addition, preferably, light to P3 illustrated in FIG. 10C is as follows. Specifically, it is preferable that the region in plan view formed by light paths of the light flux emitted from at least a part of the side surface configured such that θ2 is smaller than θ1 partially overlap P3. In this manner, it is possible to deliver light to a region where dark points tend to be generated.

Illuminance Distribution

Figure 11:
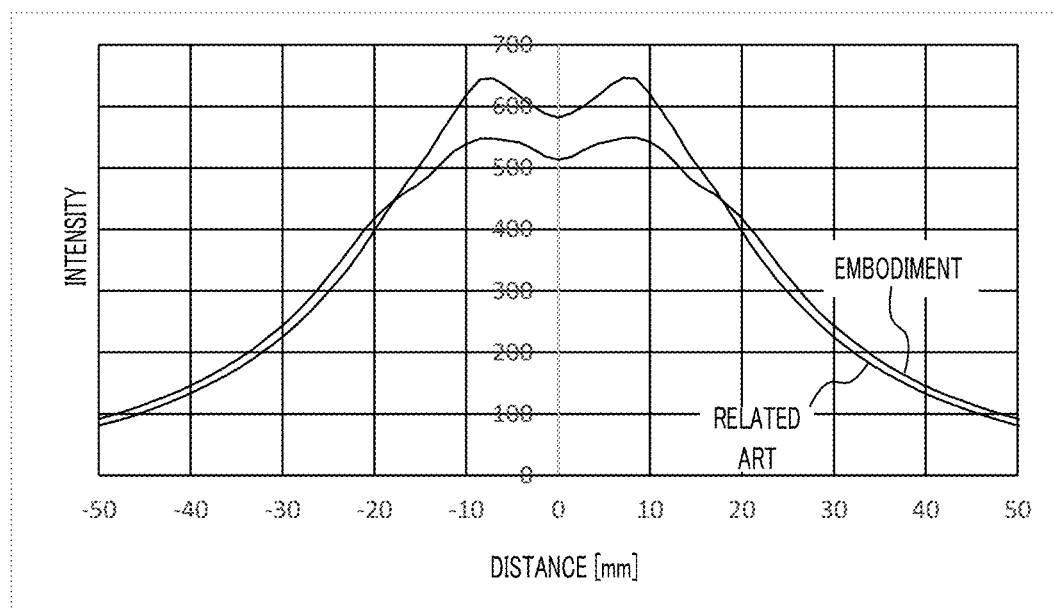
FIG. 11 is a graph illustrating an illuminance distribution.

To confirm the effect of light flux controlling member 300 according to the present embodiment, the illuminance distribution was simulated with surface light source device 100 including light-emitting device 200 according to the present embodiment, and a surface light source device including a light-emitting device of the related art. Simulation results are illustrated in FIG. 11. The illuminance distributions illustrated in FIG. 11 is an illuminance distribution on the rear surface of light diffusion plate 120. In addition, the illuminance distributions include an illuminance distribution along the L illustrated in FIG. 6A in the embodiment, and an illuminance distribution along the L illustrated in FIG. 6B in the related art.

As can be seen in FIG. 11, in surface light source device 100 according to the present embodiment, the illuminance in regions away from light-emitting device 200 is higher than that of the surface light source device of the related art. The reason for this is that side surface 332 of light flux controlling member 300 according to the present embodiment collects light in the L direction.

Effects

With light flux controlling member 300, light-emitting device 200 and surface light source device 100 of the present embodiment, darkening between light-emitting devices 200 can be suppressed even when the distance between light-emitting devices 200 is increased.

Modification

Figure 12A:
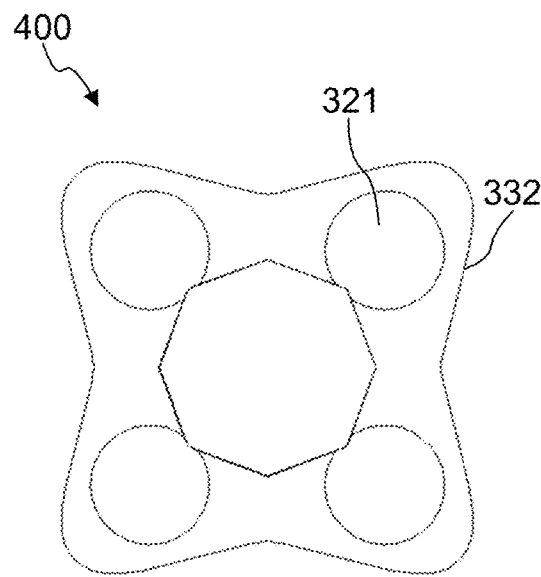
FIGS. 12A to 12D illustrate a configuration of a light flux controlling member according to a modification.
Figure 12B:
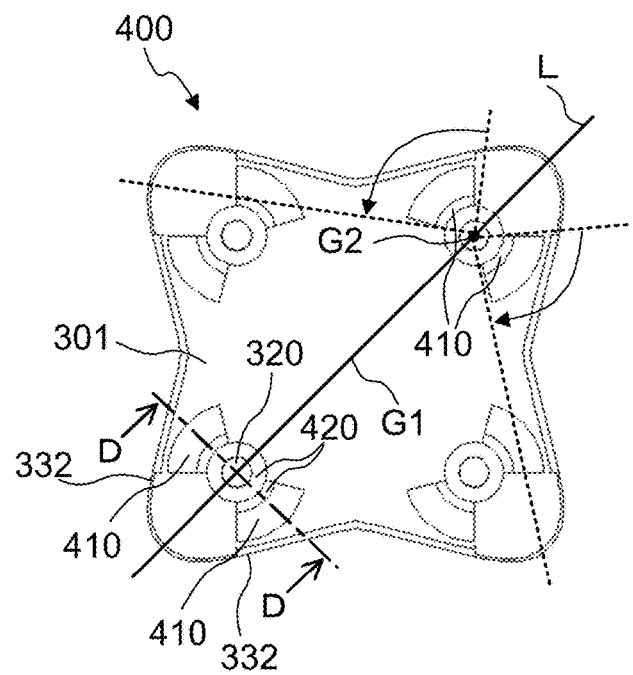
Figure 12C:
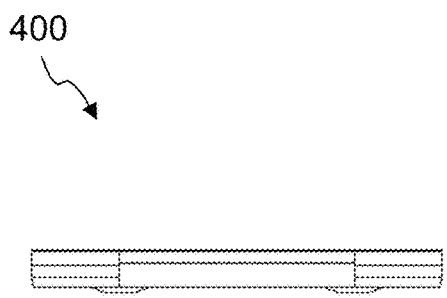
Figure 12D:
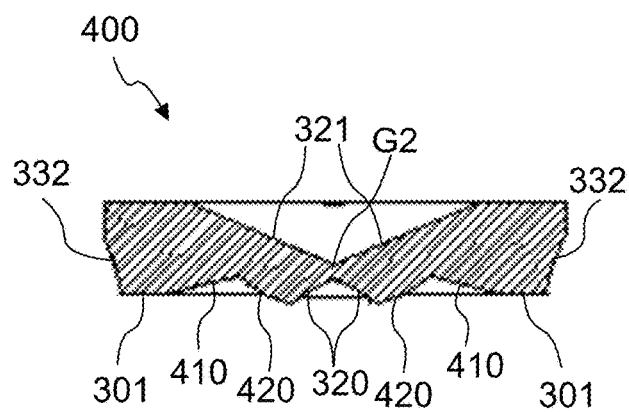
Figure 12E:
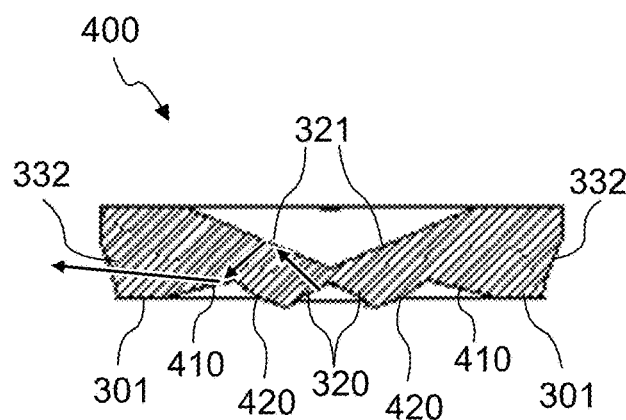
FIG. 12E illustrates light paths of a light flux controlling member according to a modification.

FIGS. 12A to 12D illustrate a configuration of light flux controlling member 400 according to a modification. FIG. 12A is a plan view of light flux controlling member 400, FIG. 12B is a bottom view, FIG. 12C is a side view, and FIG. 12D is a schematic cross-sectional view taken along line D-D of FIG. 12B. In addition, FIG. 12E schematically illustrates light paths in light flux controlling member 400. In light flux controlling member 400 according to the modification, the same components as those of light flux controlling member 300 according to the embodiment are denoted with the same reference numerals, and the description thereof will be omitted.

As illustrated in FIGS. 12B and 12D, light flux controlling member 400 includes inclined surface 410 disposed between incidence surface 320 and side surface 332 on the rear side of light flux controlling member 400, and inclined such that the distance of inclined surface 410 from substrate 210 increases in a direction toward incidence surface 320.

Inclined surface 410 is configured to reduce a situation where light reflected by first reflection surface 321 is reflected upward by rear surface 301 of light flux controlling member, thus forming a bright spot at a position near side surface 332. Note that the bright spot tends to be generated especially at a position near side surface 332 (side surface 332 of the constricted portion of light flux controlling member 400) closest to gravity center G1 of light flux controlling member 400 in plan view of light flux controlling member 400, and inclined surface 410 suppresses the generation of the bright spot.

To be more specific, as illustrated in FIG. 12E, inclined surface 410 suppresses the generation of the bright spot by laterally reflecting the light reflected by first reflection surface 321.

The configuration of inclined surface 410 is not limited as long as the above-mentioned function can be ensured. In the present embodiment, inclined surface 410 is an inner surface of a recess formed in rear surface 301 of light flux controlling member 400. The angle of inclined surface 410 with respect to rear surface 301 is also not limited as long as the above-mentioned function can be ensured. It suffices that the angle of inclined surface 410 with respect to rear surface 301 is 1° to 45°, for example. In addition, preferably, the angle is 5 to 20°.

It is preferable that inclination surface 410 be disposed in the following manner in bottom view of light flux controlling member 400. Specifically, inclined surface 410 is disposed around center G2 of first reflection surface 321, within a range of 45° to 135° when rotated clockwise or counterclockwise with respect to the line)(0°) along line L in the direction of the corner of light flux controlling member 400 in bottom view of light flux controlling member 400 as the broken line indicates in of FIG. 12B. When inclined surface 410 is disposed in this range, it is possible to reduce the light reflected at rear surface 301 toward the position near the constricted portion of light flux controlling member 400, where the bright spot tends to be most easily caused. In addition, preferably, inclined surface 410 is disposed in a line-symmetric manner with respect to straight line L in bottom view. In addition, preferably, inclined surface 410 is disposed around center G2 of first reflection surface 321.

As illustrated in FIG. 12D, light flux controlling member 400 may include inner surface 420. Inner surface 420 is a surface disposed between inclined surface 410 and incidence surface 320 on the rear side of light flux controlling member 400. In addition, in the present embodiment, inner surface 420 is a surface that is not inclined surface 410 in the inner surface of the recess described above. That is, in the present embodiment, inner surface 420 and inclined surface 410 are surfaces provided in the same recess, and inner surface 420 is located inside than inclined surface 410.

Inner surface 420 may be tilted, or perpendicular, with respect to rear surface 301. In the present embodiment, inner surface 420 is tilted with respect to rear surface 301. Specifically, inner surface 420 is tilted such that the distance to substrate 210 decreases in the direction toward incidence surface 320. The inclination angle of inner surface 420 in the case where inner surface 420 is provided is not limited, but is preferably 1° to 90° (perpendicular) with respect to rear surface 301. In the case where the angle is close to perpendicular, the region immediately above inner surface 420 tends to be easily brightened, and it is highly possible that the quality becomes poor, and therefore, it is more preferable that the angle be 1° to 60°. Further, it is more preferable that the angle be 20° to 50°.

In addition, as illustrated in FIG. 12D, the end portion of inner surface 420 on substrate 210 side may be configured to be protruded from rear surface 301 (to be located on substrate 210 side than rear surface 301). With this configuration, when light flux controlling member 400 is disposed on substrate 201, a gap can be formed between rear surface 301 and substrate 210. This gap is useful to dispose a reflection material (reflection sheet) between substrate 210 and light flux controlling member 400.

Figure 13A:
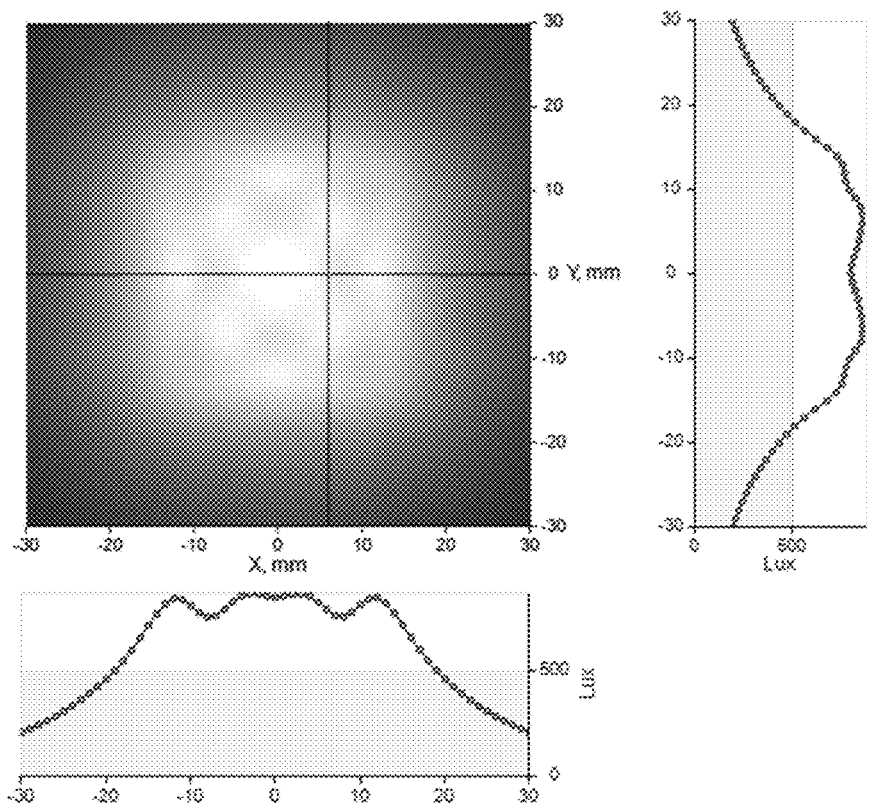
FIG. 13A illustrates an illuminance distribution of the embodiment.
Figure 13B:
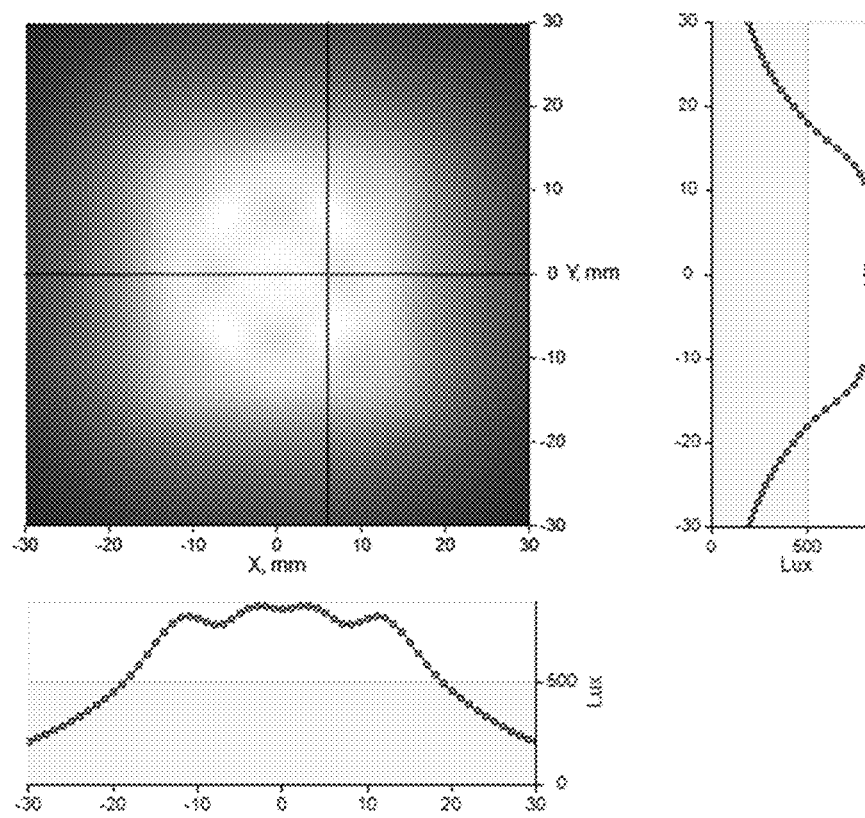
FIG. 13B illustrates an illuminance distribution of the modification.

FIG. 13A illustrates an illuminance distribution of the light flux controlling member of the embodiment provided with no inclined surface 410 in plan view, and FIG. 13B illustrates an illuminance distribution of light flux controlling member 400 of the modification provided with inclined surface 410 in plan view. In each drawing, the right graph illustrates an illuminance distribution along the vertical line indicated in flux controlling member 400 plan view, and the bottom graph illustrates an illuminance distribution along the horizontal line (a line passing through gravity center G1 of light flux controlling member 400 and side surface 332 closest to gravity center G1, i.e., a line passing through the constricted portion of light flux controlling member 400).

Figure 14:
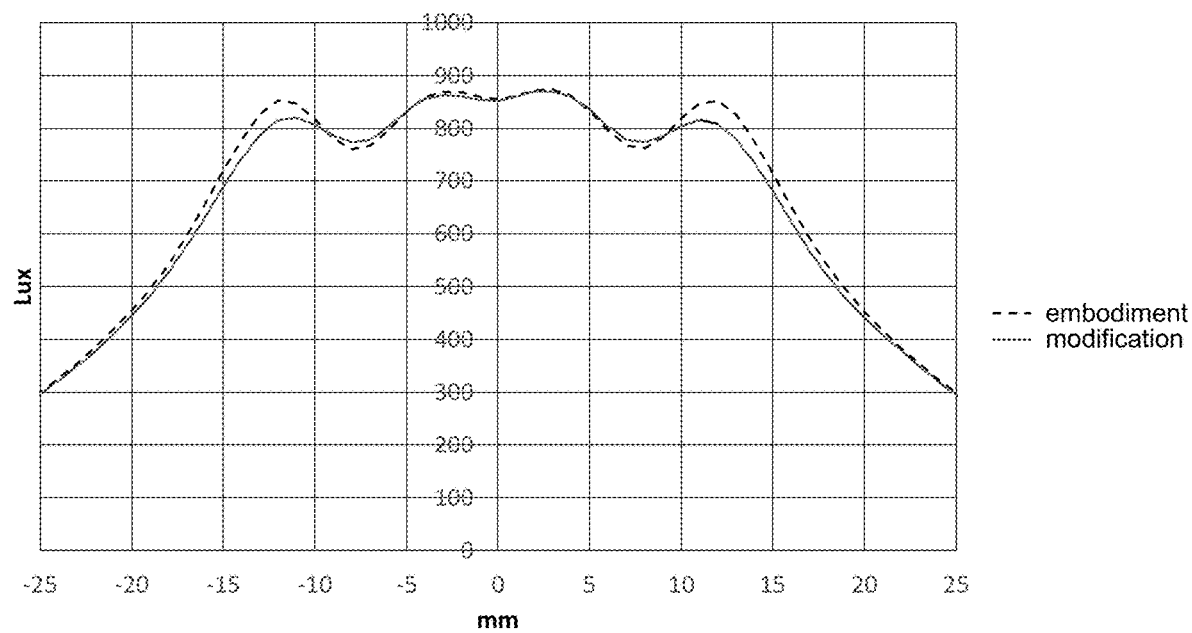
FIG. 14 is a graph for comparison between the illuminance distributions of FIGS. 13A and 13B.

In addition, FIG. 14 illustrates the bottom graphs of FIGS. 13A and 13B on the same graph for the sake of comparison.

As shown in FIGS. 13A, 13B and 14, in the modification, the generation of the bright spot in the region near side surface 332 of light flux controlling member 400 is suppressed. A reason for this is that in light flux controlling member 400, which includes inclined surface 410, the light reflected by rear surface 301 toward side surface 332 of the constricted portion of light flux controlling member 400 is reduced.

Industrial Applicability

The light flux controlling member, the light-emitting device and the surface light source device according to the present invention may be applied to, for example, a backlight of a liquid crystal display device and general-purpose lighting.

Reference Signs List

100 Surface light source device
100' Display device
102 Display member
110 Housing
112 Bottom plate
114 Top plate
120 Light diffusion plate
121 Optical sheet
200, 200' Light-emitting device
210 Substrate 220 Light-emitting element
300, 300', 400 Light flux controlling member
301 Rear surface
310 Incident unit
320 Incidence surface
321 First reflection surface
322 Third reflection surface
330 Emission unit
331 Second reflection surface
332, 332' Side surface
333 Emission surface
360 Leg part
410 Inclined surface
420 Inner surface
CA Central axis
LA Optical axis
G1 Gravity center
G2 Center of first reflection surface

The invention claimed is:

1. A light flux controlling member configured to control a distribution of light emitted from a plurality of light-emitting elements disposed on a substrate when the light flux controlling member is disposed over the plurality of light-emitting elements, the light flux controlling member comprising:
 a plurality of incident units configured to allow incidence of the light emitted from the plurality of light-emitting elements; and
 an emission unit disposed between each of the plurality of incident units in a direction along the substrate, and configured to emit light entered from the plurality of incident units while guiding the light,
 wherein each of the plurality of incident units includes:
  an incidence surface disposed on a rear side of the light flux controlling member, and configured to allow incidence of light emitted from each of the plurality of light-emitting elements; and
  a reflection surface disposed at a position opposite to each of the plurality of light-emitting elements with the incidence surface between the reflection surface and each of the plurality of light-emitting elements on a front side of the light flux controlling member, the reflection surface being configured to laterally reflect, in a direction away from an optical axis of each of the plurality of light-emitting elements, light entered from the incidence surface,
 wherein at least a part of a side surface of the light flux controlling member is configured such that θ2 is smaller than θ1,
 where, in plan view of the light flux controlling member, L is a line connecting a gravity center G1 of the light flux controlling member and a center G2 of the reflection surface,
 L1 is a line connecting a center P1 of a light-emitting surface of each of the plurality of light-emitting elements and a point P2 on the side surface of the light flux controlling member where light emitted from the center P1 of the light-emitting surface and reflected by the reflection surface directly reaches,
 L2 is a line along light emitted from the point P2 to outside of the light flux controlling member,
 θ1 is an angle between L and L1, and
 θ2 is an angle between L2 and a line L' that is parallel to L,
 wherein, in the plan view of the light flux controllinh member, the side surface at a corner of the light flux controlling member is not concentric with an outer edge of the reflection surface, and located on a circle having a curvature radius smaller than a concentric circle of the outer edge of the reflection surface, a center of the circle having the curvature radius located on L, and
 wherein, in the plan view of the light flux controlling member, two sloe surfaces on both sides of the corner are disposed such that extensions of the two side surfaces form an acute angle.

2. The light flux controlling member according to claim 1, wherein the side surface of the light flux controlling member is configured such that θ2 is smaller than θ1, θ1 being within a range of 0° <θ1≤45°.

3. The light flux controlling member according to claim 1, wherein θ2 is within a range of θ20°.

4. The light flux controlling member according to claim 1, further comprising an inclined surface disposed between the incidence surface and the side surface on a rear side of the light flux controlling member, the inclined surface being inclined such that a distance of the inclined surface from the substrate increases in a direction toward the incidence surface.

5. A light-emitting device, comprising:
 a plurality of light-emitting elements disposed on a substrate; and
 the light flux controlling member according to claim 1 that is disposed over the plurality of light-emitting elements.

6. A surface light source device, comprising:
 the light-emitting device according to claim 5; and
 an optical sheet or a light diffusion plate configured to transmit light emitted from the light-emitting device.

7. A display device, comprising:
 the surface light source device according to claim 6; and
 a display member configured to be illuminated with light emitted from the surface light source device.

* * * * *